March 7, 1961
N. N. KOROTKEVICH
2,974,079
HEAT DECOMPOSABLE SPLICE MANDREL FOR
ENDLESS TUBULAR SEALS
Filed Sept. 30, 1959
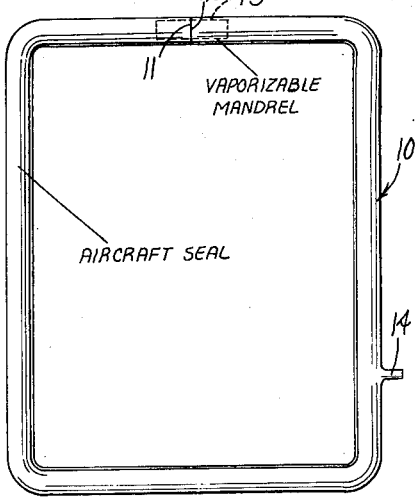
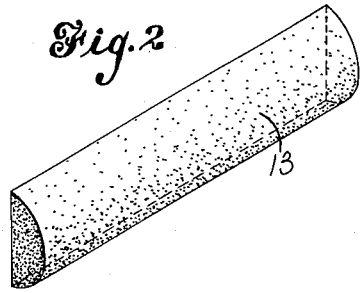
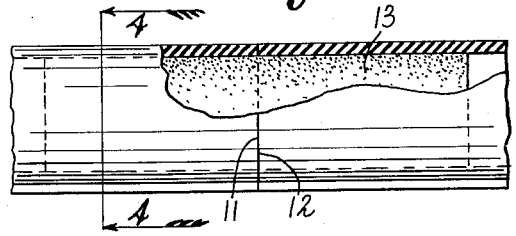
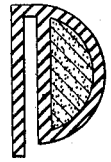
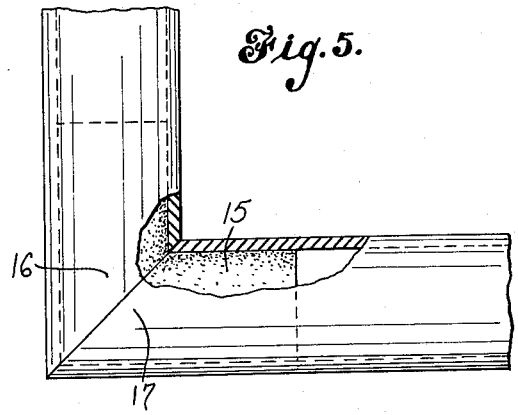
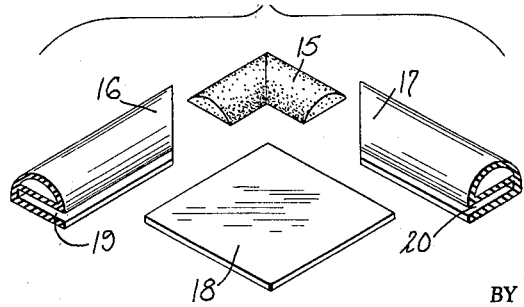
INVENTOR
Nikolai N. Korotkevich
BY Rockwell & Bartholow
ATTORNEYS

United States Patent Office 2,974,079
Patented Mar. 7, 1961

2,974,079

HEAT DECOMPOSABLE SPLICE MANDREL FOR ENDLESS TUBULAR SEALS

Nikolai N. Korotkevich, New Haven, Conn., assignor to The Connecticut Hard Rubber Company, New Haven, Conn., a corporation of Connecticut Filed Sept. 30, 1959, Ser. No. 843,484

2 Claims. (Cl. 154—43)

This invention relates to an improved method for splicing or joining the butted ends of hollow members of extruded rubber, plastic and similar materials and to the resulting article of manufacture.

More particularly, this invention relates to a novel means of providing for the manufacture of continuous or discontinuous lengths of elongated hollow members whereby a disposable core mandrel is employed to maintain the butted ends of the hollow rubbers in accurate adjoining relation until the joint is perfected through vulcanization or other suitable means. A further object of the invention is to provide a core mandrel which is simple to manufacture and can be economically prepared in any shape or form which affords a substantial saving in the manufacture of continuous or closed lengths of articles of rubber and other materials.

Other objects and advantages of the invention will be increasingly apparent on consideration of the accompanying description of a specific embodiment of the invention and the scope of the invention will be defined by the claims.

Various hollow rubber shaped articles such as inflatable seals, for example, are prepared by extrusion of rubber and vulcanization of the extruded lengths. Usually it is necessary to join two ends of the extruded lengths to form a continuous seal, for example, of oval or circular contour. The joint then is made from the same type of rubber and has to conform to the exact shape and internal and external dimensions of the seal. In the formation of such seals it is necessary to provide a rigid core which snugly conforms to the inside of the seal, for example, whereupon the free ends of the tube are butted and the whole subjected to pressure and vulcanizing temperatures in a suitable mold. After the splice is made, the core has to be removed, dissolved or pulverized to provide uniform flexibility and dimensions of the seal.

The usual methods and materials employ such techniques as crushing the core mechanically then washing it out with water or liquid through an appropriate vent, or leaving the pulverant powder inside the seal. Such methods are inefficient because mechanical crushing often causes rupture of the rubber, washing introduces water and adds to the cost of operation. Also, leaving the powder inside the seal adds to the weight and disturbs mechanical performance of the finished product. Various types of materials heretofore used in the practice of core tube joining include the use of plaster of Paris, isocyanate foams, waxes, gelatin, metal alloys and various resins. All these materials have disadvantages, for instance, waxes are not rigid and have low melting points, plaster of Paris is too brittle and difficult to remove and resins or foams are difficult to form and remove from the completed seal. Moreover, some of the materials tend to inhibit proper vulcanization due to harmful gases or liquids.

I have found that, unexpectedly, improved butted joints of hollow elongated articles, particularly articles of silicone and other rubber material, can be made by the use of a volatile mandrel which accurately holds the butted ends of the hollow articles in accurate alignment while the joint is perfected through a cement containing vulcanizing agents, for example. The material which I preferably employ is of such a character that it decomposes to form volatile gases during the heat treatment required to vulcanize dry and permanently join the butted ends of the hollow rubbers into a continuous structure.

Although any material which will volatilize under specified conditions is suitable for purposes of the invention, I have found that salts, especially inorganic salts, which decompose upon heating to form non-reactive volatile compounds are especially suitable. Also suitable for the purpose of the invention are those materials which sublime directly to the vapor phase. The material appropriate for the particular application would depend upon the characteristics of the tubular body, the temperature required to vulcanize or fuse, in the case of plastics, the ends of the hollow members into an integral structure.

Those materials which can be compressed and molded in shape under pressure and heat, if desired can be combined with a small amount of a binder without the use of high pressure, and be suitably used in a process of splicing the hollow shaped articles of rubber, for example.

A material found especially suitable for splicing silicone and other rubber material is ammonium carbonate which can be compressed without or with a binder and will decompose into ammonia gas and carbon dioxide, both non-reactive with most rubbers. As a binder magnesium stearate or gum arabic can be used in various proportions depending upon the strength requirements of the core and the degree of pressure to be used to mold a desired shape.

The drawings illustrate typical applications of my improved splice method applied to typical forms of hollow gaskets.

In the drawings:

Fig. 1 is a front elevation of an endless tubular gasket of the type used for sealing aircraft doors.

Fig. 2 is a perspective of the form of volatile mandrel used in the gasket construction of Fig. 1.

Fig. 3 is an enlarged detail showing the volatile mandrel in position prior to application of the vulcanization temperature.

Fig. 4 is a sectional view on the line 4—4 of Fig. 3.

Figs. 5 and 6 illustrate the application of my improved method to a corner splice construction.

Referring in detail to the drawings, the numeral 10 designates in general a hollow molded seal of silicone or other rubber material which can be either in the fully or partially vulcanized state. The free ends 11 and 12 of this seal construction are provided with a coating of an unvulcanized rubber cement, such as a silicone rubber cement, containing benzoyl peroxide or other curing reagent. In assembling the construction shown in Fig. 1, the free ends 11 and 12 of the hollow seal 10 are brought together over a volatile mandrel 13 of ammonium carbonate or other suitable material of the type shown in Fig. 2, for example, so that they are in butted relation and the seal is placed in a suitable mold. Where the hollow seal 10 has been fully vulcanized only the area of the splice portion including the volatile mandrel 13 is subjected to heat and pressure in an appropriate molding device. It will be observed in Fig. 1 that the hollow seal 10 includes a stem 14 for the purpose of inflating the seal after it has been suitably positioned in the door construction. On the application of heat to the splice area, the butted ends 11 and 12 are adhered and joined together as heat penetrates through the wall of the hollow member and cures or partially cures the adhesive cement composition. As the temperature inside of the hollow seal 10 reaches the vulcanization temperature, the volatile mandrel 13 slowly begins to decompose and forms gaseous components which are inert to the material of the hollow seal member 10. This process continues until the mandrel is almost completely volatilized, leaving substantially no residue within the hollow seal 10, and such gaseous components may be vented through the stem 14 as will be readily appreciated.

In the modification of Figs. 5 and 6, a volatile core mandrel 15 of angular construction is used for joining in the corner of a hollow gasket member by applying a suitable cement material to the ends 16 and 17 of a hollow gasket construction. Fig. 5 shows the core member 15 positioned in supporting relation to the free ends 16 and 17 of the hollow gasket seal. If desired, a positioning device 18 shown in Fig. 6 may be inserted into slots 19 and 20 of the ends 16 and 17 being joined together. As before, an appropriate temperature is applied either to the entire seal or to the area of the seal which includes the mandrel and joined ends 16 and 17 to fuse or integrate the free ends together and vaporize the volatile mandrel 15.

The table below shows the effect of adding a binder of magnesium stearate to ammonium carbonate where this material forms the composition of the volatile core mandrel 13. The compositions shown in the table below were prepared and carefully mixed until completely homogeneous. Cores were then prepared by pressing in a cylindrical mold under 2500 p.s.i. pressure. The resistance of the cylindrical samples to crushing was then determined. The compressive strengths which were measured are also shown in the table. The compressive strength of similar cores made from Brak-Away plaster, a frangible plaster produced by the National Gypsum Company, was also measured and found to be 160 p.s.i. Cores made from composition D were next used to splice together separate sections of cylindrical silicone rubber tubing, using the same techniques described above. Satisfactory spliced joints were found to result and upon subsequent heating in a circulating air oven, the cores were found to be substantially decomposed after 30 minutes at 300° F.

Table 1

| Percent Ammonium Carbonate | Percent Magnesium Stearate | Compressive Strength in p.s.i. |
| --- | --- | --- |
| 100 | 0 | low |
| 95 | 5 | 31 |
| 90 | 10 | 160 |
| 80 | 20 | 360 |

It will be observed from this table that without a binder pure ammonium carbonate may be compressed to form a core mandrel having a relatively low compressive strength. The addition of small quantities of magnesium stearate greatly improves the compressive strength of the core mandrel where this is required for special applications.

The unobvious feature of the invention is that the bond between the opposing butted members is sufficiently established by the time the externally applied heat reaches the volatile mandrel. In the case of endless circular seals of silicone rubber for aircraft, a silicone rubber cement containing vulcanizing agents, such as benzoyl peroxide, may be applied to the ends to be joined which are then positioned over a solid vaporizable mandrel having a vaporizing temperature which may be below the vulcanization temperature of the cement. The arrangement is positioned in a mold under pressure and heat applied at a temperature of from 280 to 300° F. which causes the cement to at least partially cure and join the butted ends together. Where compressed ammonium carbonate forms the mandrel, volatilization does not begin to occur until the mandrel becomes heated to about 140° F. and by this time a bond between the butted members has occurred. In bonding the ends of hollow plastic members, which are joined through fusion, a volatile mandrel would be selected which vaporizes into gaseous components which are inert to the plastic at a temperature below that applied to the joined sections.

Of course, solid mandrels having vaporization temperatures above the bonding temperature may be employed in which event a higher temperature than that required for the abutment bond sufficient to volatilize the mandrel would be used. It will be understood that the characteristics of the mandrel, temperatures applied at the seam area and other variables will depend upon the circumstances of the particular application and desired results and will be apparent from the foregoing disclosure and accompanying description to those skilled in the art.

While I have shown and described a preferred embodiment of my invention, it will be understood that it is not to be limited to all of the details shown, but is capable of modification and variation within the spirit of the invention and within the scope of the claims.

What I claim is:

1. As an article of manufacture a splice construction comprising a mandrel predominantly composed of ammonium carbonate and hollow members capable of heat integration butted together over the mandrel.

2. As an article of manufacture a splice construction comprising a mandrel predominantly composed of ammonium carbonate and hollow members in a continuous hollow seal of silicone rubber having its ends butted together over the ammonium carbonate mandrel and a cementitious material containing a vulcanizing reagent between the butted ends of said continuous hollow silicone rubber seal.

References Cited in the file of this patent
UNITED STATES PATENTS 1,531,712    Meade _____ Mar. 31, 1925
2,503,882    Medford _____ Apr. 11, 1950